US012095938B2

(12) United States Patent
Kim

(10) Patent No.: US 12,095,938 B2
(45) Date of Patent: Sep. 17, 2024

(54) APPARATUS FOR HOLDING A SMART PHONE

(71) Applicant: PROPELL INC., Hanam-si (KR)

(72) Inventor: Eon-ho Kim, Hanam-si (KR)

(73) Assignee: PROPELL INC., Hanam-si (KR)

( * ) Notice: Subject to any disclaimer, the term of this patent is extended or adjusted under 35 U.S.C. 154(b) by 0 days.

(21) Appl. No.: 18/039,708

(22) PCT Filed: Dec. 3, 2021

(86) PCT No.: PCT/KR2021/018192
§ 371 (c)(1),
(2) Date: May 31, 2023

(87) PCT Pub. No.: WO2022/119373
PCT Pub. Date: Jun. 9, 2022

(65) Prior Publication Data
US 2023/0353666 A1    Nov. 2, 2023

(30) Foreign Application Priority Data

Dec. 4, 2020 (KR) .................. 10-2020-0168681
Nov. 23, 2021 (KR) .................. 10-2021-0162501

(51) Int. Cl.
*H04M 1/02* (2006.01)
(52) U.S. Cl.
CPC .................... *H04M 1/0279* (2013.01)
(58) Field of Classification Search
CPC .......... H04M 1/0279; H04M 1/724095; A45C 13/30; A45C 2011/002
See application file for complete search history.

(56) References Cited

U.S. PATENT DOCUMENTS

| 9,793,941 B1* | 10/2017 | Hirsch .................. G06F 1/1656 |
| 2021/0084132 A1* | 3/2021 | Chou .................... G06F 1/1681 |

FOREIGN PATENT DOCUMENTS

| KR | 10-1062570 B1 | 9/2011 |
| KR | 10-2012-0019971 A | 3/2012 |
| KR | 10-2014-0089892 A | 7/2014 |
| KR | 10-1764064 B1 | 8/2017 |
| KR | 10-1825404 B1 | 2/2018 |
| KR | 10-2019-0097834 A | 8/2019 |
| KR | 20-0492746 Y1 | 12/2020 |

OTHER PUBLICATIONS

Sinjimoru Universal Silicone Phone Grip Holder, as Cell Phone Stand, Sinji Loop Stand https://www.youtube.com/watch?v=gwOwTikgUu8 Jul. 27, 2020 (Year: 2020).*
International Search Report for PCT/KR2021/018192 mailed Mar. 17, 2022 from Korean Intellectual Property Office.

* cited by examiner

*Primary Examiner* — Keith Ferguson
(74) *Attorney, Agent, or Firm* — Revolution IP, PLLC

(57) ABSTRACT

The present disclosure relates to a mobile device grip assistive device that can improve convenience and economics in gripping of a mobile device such as a smart phone, and provides a mobile device grip assistive device including disposed in an up-down direction behind a mobile device and having flexibility, and a mechanism portion having a hole through which the strap can be disposed, and having a holding space in which friction is provided by an elastic restoration force of the strap when a finger is positioned between the front surface of a plate member and the rear surface of the strap.

4 Claims, 32 Drawing Sheets

APPARATUS FOR HOLDING A SMART PHONE

CROSS REFERENCE TO PRIOR APPLICATIONS

This application is a National Stage Application of PCT International Patent Application No. PCT/KR2021/018192 filed on Dec. 3, 2021, under 35 U.S.C. § 371, which claims priority to Korean Patent Application Nos. 10-2020-0168681 filed Dec. 4, 2020 and 10-2021-0162501 filed on Nov. 23, 2021, respectively, which are all hereby incorporated by reference in their entirety.

TECHNICAL FIELD

The present disclosure relates to an apparatus for a grip of a mobile device and, in more detail, an apparatus for holding a smart phone, the apparatus being able to improve convenience in use when holding mobile devices such as a smart phone and being able to improve economics in manufacturing and keeping.

BACKGROUND ART

In general, various kinds of functions are added to smart phones with the development of the electronic and communication technologies, and accordingly, various applications are installed to implement various functions, play various contents including videos, take pictures through built-in cameras, search through the internet, transmit/receive mails, etc.

A smart phone is a necessary and people increasingly carry and use smart phones anytime anywhere regardless of sex and age. Accordingly, smart phone holders such as a strap, a smart ring, a pop socket have been developed and sold to stably and conveniently hold smart phones that are expensive products due to implementation of these functions.

However, products for holding smart phones such as a strap, a smart ring, or a pop socket in the related art are large in volume or have a problem of still being inconvenient to hold smart phones such as slip of fingers. In particular, strap products of the related art do not have a function of preventing a smart phone from sliding down with a hand inserted in the strap products, so an excessive force is required to use the strap products, which causes inconvenience. The positions of smart ring or pop socket products are fixed and the smart ring or pop socket products are used with a finger in close contact with the rear surface of a smart phone, so there is a problem that it is difficult to use the smart ring or pop socket products for a long period of time.

As another related art of an apparatus for holding a smart phone, an "Apparatus to assist a user with holding a mobile device" has been disclosed in U.S. patent Ser. No. 09/793,941.

However, this related art has a problem that not only the combination structure of a finger brace and first, second, third, and fourth flexible lengths is complicated, but it is inconvenient to use the apparatus and it is difficult to stably hold the apparatus due to two-division installation structure of the first, second, third, and fourth flexible lengths.

Further, a finger ring for a mobile terminal that provides a ring to be able to use a smart phone with a finger inserted in the ring has been disclosed in Korean Patent No. 10-1062570.

FIG. 1 is a perspective view of the finger ring of the related art and the finger ring is described in detail.

Since a ring that is attached to the rear surface of a mobile terminal 3 and in which a finger can be inserted is formed, the mobile terminal 3 can be safely and easily held and it is possible to rotate the mobile phone 3 various angles to the left and right with a finger inserted in a ring member 12, whereby convenience in use can be remarkably increased. Further, it is possible to easily hold the mobile terminal 3 on not only a floor such as a table, but a wall when a user wants to watch video contents such as broadcasts and movies using the mobile terminal 3.

However, such a finger ring type holder contributes to preventing a drop accident by supplementing the holding ability of smart phone cases of the related art, but it is possible to insert only one finger, so there is a problem that fatigue of only one finger is accumulated. Further, a hinge is applied to the ring to minimize the volume when keeping the finger ring, so the finger ring can be used separately for keeping and using, but there is a defect that the structure for this function is complicated, and the volume and weight are increased. This causes poor portability and limits efficiency and economics in production.

DISCLOSURE

Technical Problem

In order to solve the problems of the related art, an objective of the present disclosure is to prevent a smart phone from sliding down by attaching a supporting plate, which supports fingers, to the middle of a strap, to make it possible to change the position of the supporting plate in use in accordance with purposes by enabling the supporting plate to move along the strap, and to make it possible to freely move fingers while using a product by using a strap having high flexibility.

Further, an objective of the present disclosure is to provide a grip assistive device for a mobile device, the assistant grip being able to maximize the ability of gripping a mobile device, being able to be changed in accordance with various holding types, and being able to secure portability.

Technical Solution

In order to achieve the objectives described above, the present invention comprising a strap having flexibility and disposed in the up-down direction of rear of a smart phone and a supporting plate that allows one finger to be inserted between the strap which is disposed to pass through the penetration hole.

The supporting plate can move along the strap through the penetration hole.

Any one finger is inserted between a lower supporting surface and the strap and an upper part is supported by another finger, whereby the supporting plate is restricted in movement along the strap by friction with the strap in the penetration hole.

The supporting plate having a folding portion that allows the upper part and the lower part to fold.

The folding portion has a hinge axis and a hinge restoration portion that provides a restoring force for folding.

The hinge restoration portion has a hinge coupling portion arranged at a position where the upper part and the lower part are connected to the hinge axis, and both ends of a spring are fixed to the upper part and the lower part, respectively, to provide a restoring force.

The supporting plate receives rotational force in a direction where the upper part approaches the smart phone due to the restoring force of the strap.

The penetration hole formed in the vertical direction of the supporting plate.

The penetration hole consists of a first hole formed at the upper part and a second hole formed at a lower part.

The supporting plate has an upper step limiting an unfolded limit with a retainer of the first plate member locked, and a second step setting a rearward rotation limit.

Both ends of the strap may be attached to the top and the bottom portion of the smart phone.

Both ends of the strap may be attached to the top and the bottom portion of a smart phone case.

Meanwhile, in one aspect of the present disclosure, an apparatus for holding a smart phone, comprising: a strap having elasticity in a longitudinal direction and disposed on a rear surface of a smart phone; and a supporting plate having an upper part and a lower part that are foldably connected to each other, having a penetration hole in which the strap is inserted, and receiving a restoration force that acts in a direction where the upper part and the lower part return to form a plane.

The strap and the upper part and the lower part of the supporting plate make it possible to hold the smart phone due to an increase of friction by a restoration force of the strap with fingers in close contact.

The supporting plate maintains a position where the supporting plate is coupled to the strap when an external force is not applied.

The upper part and the lower part of the supporting plate are supported by different fingers and a restoration force of the strap increases friction acting on the fingers.

The supporting plate further has a hinge shaft connecting the upper part and the lower part, and a hinge restoration portion providing a restoration force when the upper part and the lower part are folded.

The supporting plate provides any one or more of fingers with friction between the upper part or the lower part and the strap.

Further comprising a case to which both ends of the strap are coupled.

Both ends of the strap can be attached to the top and the bottom portion of the smart phone.

Both ends of the strap can be attached to the top and the bottom portion of a smart phone case.

Both ends of the strap can be attached to the top and the bottom portion of an attachment plate, which is attachable to the back of the smart phone.

The supporting plate may have a single penetration hole.

The supporting plate has several penetration holes and the strap may pass through the penetration holes in a zigzag pattern.

The supporting plate may be formed such that the penetration hole extends to a side of a center from an end.

The supporting plate may be formed such that the penetration hole extends from a side of a predetermined portion to another side at the center.

The supporting plate may be formed such that the penetration hole extends from a side of a predetermined portion to the side of the center.

The supporting plate may be formed such that the penetration hole extends to the center from an end penetrates the center.

The supporting plate may be formed such that the penetration hole extends from an end to the center through a protrusion formed to extend from the end to the center on a side.

The supporting plate may be formed such that the penetration hole is through each of protrusions formed at an end and the center on a side.

A penetration hole may be formed in a protrusion formed at the center on a side of a supporting plate and supporting projections supporting the strap may be formed over and under the protrusion, respectively.

An elastic member pressing the strap may be installed in the penetration hole.

Meanwhile, according to another description of the present disclosure, there is provided a mobile device grip assistive device including: a strap having flexibility and disposed in the up-down direction of a mobile device; and a mechanism portion consisting of a plate member and a penetration hole through which the strap is disposed and that couples the plate member at a selected height on the strap.

There may be provided a holding space that holds a finger in accordance with a rearward elastic restoration force and forward rotation of the plate member when the finger is inserted between the plate member and the strap under the hole.

In an embodiment, the penetration hole may be formed through the front and rear and the strap may be bent at the hole to maintain the position of the mechanism member.

A rotation force may be applied to the upper part of the plate member toward a mobile device in an insertion section by a restoration force of the strap.

In an embodiment of the present disclosure, the penetration hole may be formed in the up-down direction.

Further, the mechanism portion may be composed of a first plate member and a second plate member being able to rotate with respect to each other with the plate member connected to a shaft, and the hole may be composed of a first hole formed at the first plate member and a second hole formed at the second plate member.

It is preferable that the strap is disposed to cover a hinge portion, which is formed between the first hole and the second hole, from the rear.

Further, when an external force is not applied, the front surfaces of the first plate and the second plate of the mechanism member are disposed close to the rear of a mobile device and can rotate rearward toward each other.

The second plate member may have an upper step limiting an unfolded limit with a retainer of the first plate member locked, and a second step setting a rearward rotation limit.

Meanwhile, any one selected from the first plate member and the second plate member is supported behind a mobile device and the other one is rotated and supported on a floor, whereby the mechanism member may be used as cradle.

Advantageous Effects

According to the present disclosure, since a strap having flexibility is used, there is an effect that it is possible to hold a smart phone using a natural arch-shaped hand shape, it is possible to implement various postures of a smart phone including a supporting plate in accordance with angle variation of a hand, etc. because the shape of a hand holding a smart phone is not fixed, it is possible to freely move and use the supporting plate in any direction, it is easy to carry and keep the apparatus because it is possible to minimize the thickness, it is possible to minimize interference in wireless charging, it is possible to immediately use the apparatus without specific operation such as angle adjustment before and after using.

Further, an effective holding force is provided by adapting to various types of grips even by a simple structure of a plate and a strap, it is possible to contribute to not only convenience in use, but productivity and economics.

Further, since a mobile device is held by fingers or a palm by combining a rotation type and an elastic restoration force, there is an effect that load on muscles for gripping mobile device decreases and it is possible to induce safe use with health of a user.

Further, since thin members are used, a disadvantage in height remarkably decreases as compared with the complicated structure of a ring type or a large-volume case in the related art, which results in reduction of volume and weight. Accordingly, there is an effect of being able to improve portability.

MODE FOR INVENTION

Hereafter, a mobile device grip assistive device according to the present disclosure is described in more detail with reference to the accompanying drawings.

However, embodiments to be described hereafter are provided only for detailed description for those skilled in the art to be able to easily achieve the present disclosure without limiting the protective range of the present disclosure.

When a component is "connected" with another component in the following description, it includes not only direct connection of them, but connection of them with another element or device therebetween. Further, unless explicitly described otherwise, "comprising" any components will be understood to imply the inclusion of other components rather than the exclusion of any other components.

Figure 1:
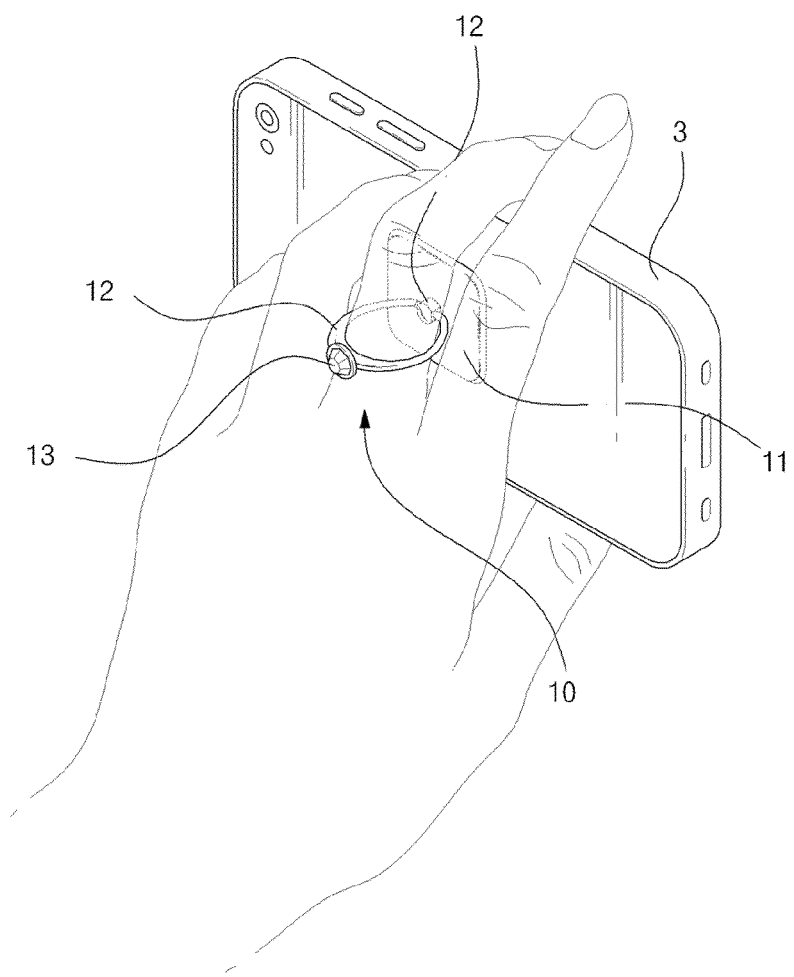
FIG. 1 is a perspective view showing a finger ring for a mobile terminal of the related art.
Figure 2:
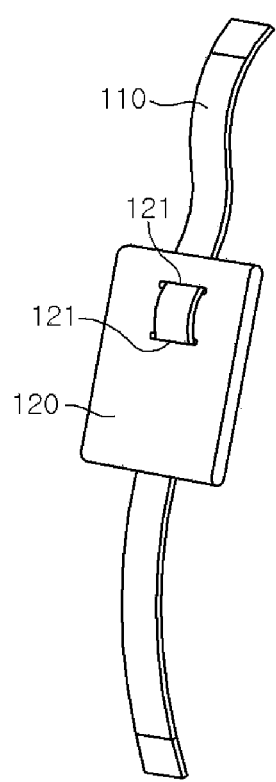
FIG. 2 is a perspective view showing an apparatus for holding a smart phone according to a first embodiment of the present disclosure.
Figure 3:
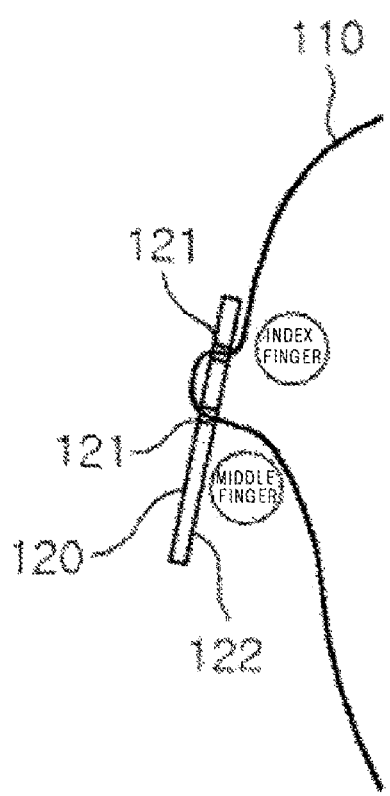
FIG. 3 is a side cross-sectional view showing a use state of the apparatus for holding a smart phone according to the first embodiment of the present disclosure.

FIG. 2 is a perspective view showing an apparatus for holding a smart phone according to a first embodiment of the present disclosure and FIG. 3 is a side cross-sectional view showing a use state of the apparatus for holding a smart phone according to the first embodiment of the present disclosure.

Referring to FIGS. 2 and 3, an apparatus 100 for holding a smart phone according to a first embodiment of the present disclosure may include a strap 110 and a supporting plate 120.

The strap 110 is installed in the up-down direction on the rear surface of a smart phone.

The strap 110 may be made of a restorable flexible material, that is, various flexible materials such as rubber, silicone, or a spandex-containing fiber. Accordingly, the strap 110 contributes to increasing friction with the supporting plate or friction of fingers by restoration force, thereby making it possible to stably hold a smart phone.

The lower end of the strap 110 is drawn forward through penetration holes 121 of the supporting plate 120 and then goes to the lower portion of a smart phone, a supporting surface 122 at the lower portion of the supporting plate is supported by any one finger, for example, a middle finger inserted between the supporting surface 122 and the strap 110, and the upper portion is supported by another finger, for example, an index finger, whereby the supporting plate 120 is fixed to the strap 110 to support a smart phone through the strap 110. That is, the supporting surface 122 disposed under the penetration holes 121 to face the strap 110 is supported by at least any one finger, for example, a middle finger positioned between the supporting surface 122 and the strap 110 and the upper portion is supported by another finger, for example, an index finger, whereby the supporting plate 120 can enable a smart phone to be supported through the strap 110.

The supporting plate 120 can move along the strap 110 by the penetration holes 121, but should not move down along the strap 110 vertically hung when an external force is not applied, and should not require an excessive force when it is moved by hand. In this configuration, the friction between the supporting plate 120 and the strap 110 may depend on the size, number, and dimensions of the penetration holes 121, the distance between the penetration holes 121, the curved portion of the strap 110, etc.

A finger is inserted between the lower portion of the supporting plate 120 and the strap 110 to use the apparatus, and the supporting plate 120 is fixed on the strap 10 without moving even though the apparatus is used in this way. The reason that the supporting plate 120 is fixed is based on fundamental friction between the supporting plate 120 and the strap 110, variation of an angle that is generated when the strap 110 supports a finger, an increase of friction that is generated when a finger pushes outward the supporting plate 120, an increase of friction that is generated when the strap 110 is stretched, and friction that is generated due to contact between a finger and the strap 110.

Meanwhile, the penetration holes 121 that the strap 110 passes through are formed through the supporting plate 120 and spaced apart from each other in the longitudinal direction of the strap 110, it is possible to prevent the supporting plate 120 from tuning over in use.

The supporting plate 120 may be prevented from moving from the strap 110 by friction with the strap 110 in the penetration holes 121 when the upper portion of the supporting surface 122 is supported by a middle finger and an index finger. That is, when an index finger supports the upper portion of the supporting plate 120 directly or through the strap 110 with a middle finger in close contact with the supporting surface 122, movement of the supporting plate 120 on the strap 110 may be restricted or suppressed due to an increase of friction with the strap 110 in the penetration holes 121 by tension in the strap 110, etc.

Figure 4:
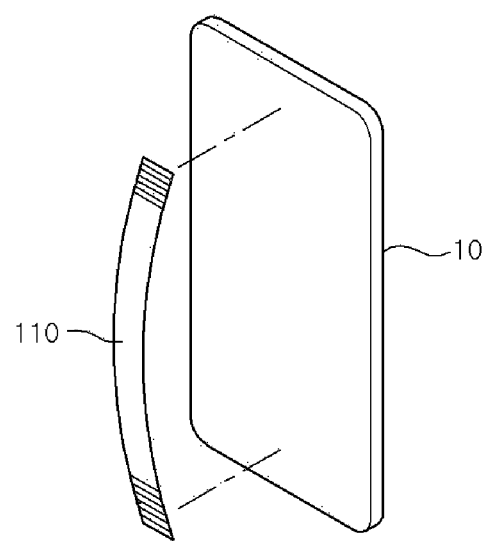
FIG. 4 is a perspective view showing an example of attaching a strap of the apparatus for holding a smart phone according to the first embodiment of the present disclosure.

As in FIG. 4, the strap 110, for example, may be attached at both ends to the upper end and the lower end of the rear surface of a smart phone, respectively.

Figure 5:
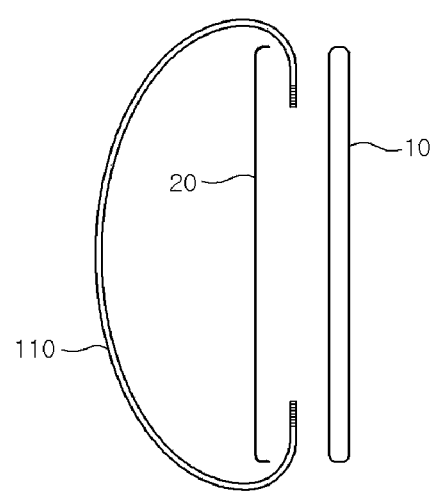
FIG. 5 is a view showing another example of attaching a strap of the apparatus for holding a smart phone according to the first embodiment of the present disclosure.

As in FIG. 5, the strap 110, as another example, may be attached at both ends to the upper end and the lower end of a case 20 of a smart phone 10, respectively.

Figure 6:
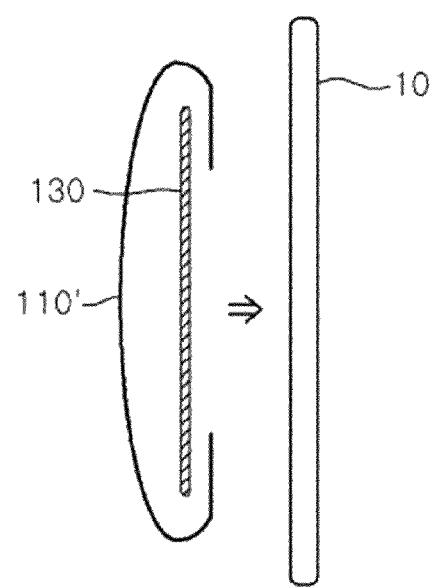
FIG. 6 is a view showing another example of attaching a strap of the apparatus for holding a smart phone according to the first embodiment of the present disclosure.

As in FIG. 6, the strap 110', as another example, may be attached at both ends to the upper end and the lower end of an attachment 130 attached to the rear surface of a smart phone 10, respectively.

In this case, an adhesive material for attaching and fixing the strap 110' may be provided on the attachment 130, and as other embodiments, may be provided at both ends of the strap 110', or may be provided at both ends of all of the attachment 130 and the strap 110', and other various attachment methods may be used.

Figure 7:
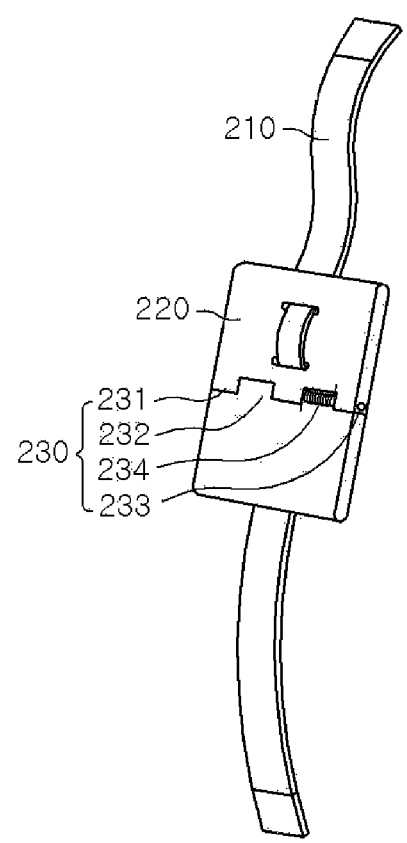
FIG. 7 is a perspective view showing an apparatus for holding a smart phone according to a second embodiment of the present disclosure.
Figure 8:
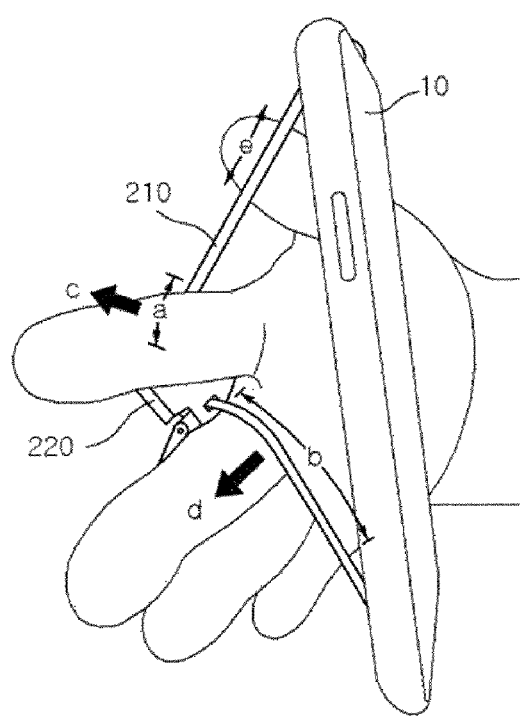
FIG. 8 is a view showing a use state to illustrate action of the apparatus for holding a smart phone according to the second embodiment of the present disclosure.

FIG. 7 is a perspective view showing an apparatus for holding a smart phone according to a second embodiment of the present disclosure and FIG. 8 is a view showing a use state to illustrate action of the apparatus for holding a smart phone according to the second embodiment of the present disclosure.

Referring to FIG. 7, an apparatus 200 for holding a smart phone according to a second embodiment of the present disclosure, similar to the apparatus 100 for holding a smart phone according to the first embodiment of the present disclosure, includes a strap 210 and a supporting plate 220 and is the same as the apparatus 100 except that the supporting plate 220 has a hinge restoration portion 230 that is a folding portion enabling up-down folding, so repeated description is omitted.

The hinge restoration portion 230 enables the supporting plate 220 to fold up and down around a hinge shaft 223 and to have a restoration force against folding. The hinge restoration portion 230 can reduce inconvenience or pain that is applied to all of fingers supporting the supporting plate 220 due to an increase of pressure and can prevent fingers from being excessively pressed between the supporting plate 220 and the strap 210. This acts in the same way in a folding guide to be described below.

The hinge restoration portion 230 has hinged portions 231 and 232 for hinging by the hinge shaft 233 at the joint at which the upper and lower parts of the supporting plate 220 are separated and jointed and both ends of a spring 234 such as a coil spring or a plate spring that is fitted on the hinge shaft 233 or installed at or around the hinge shaft 233 are fixed to the upper part and the lower part of the supporting plate 220, respectively, thereby providing a restoration force. In this configuration, the spring 234 is installed to be positioned inside the hinged portions 231 and 232, as in this embodiment, in order to prevent easy separation from the hinge shaft 233, both ends of the spring 234 are fixed to the separate upper part and lower part of the supporting plate 220, respectively, and the spring 234 can provide elasticity for returning the separate upper part and lower part of the supporting plate 220 into the same plane.

Holding a smart phone 10 is described on the basis of the apparatus 200 for holding a smart phone according to the second embodiment of the present disclosure with reference to FIG. 8, and this is applied in the same way to not only the above-mentioned embodiment, but all of the following embodiments. In this configuration, an index finger increases friction in a contact range with the index finger while pushing the upper portion of the supporting plate 220 outward (in the direction c) and a middle finger supports the supporting plate 220 and the strap 210 in a close-contact direction d between the supporting plate 220 and the strap 210, thereby increasing friction in a contact region b with the middle finger. Accordingly, it is possible to hold the smart phone 10 with the supporting plate 220 fixed on the strap 210. Further, friction between the supporting plate 220 and the fingers is increased due to a restoration force e by elasticity while the strap 210 is stretched.

Figure 9:
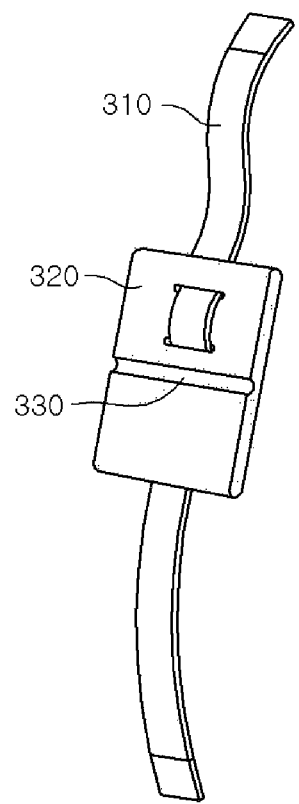
FIG. 9 is a perspective view showing an apparatus for holding a smart phone according to a third embodiment of the present disclosure.

FIG. 9 is a perspective view showing an apparatus for holding a smart phone according to a third embodiment of the present disclosure.

Referring to FIG. 9, an apparatus 300 for holding a smart phone according to a third embodiment of the present disclosure, similar to the apparatus 100 for holding a smart phone according to the first embodiment of the present disclosure, includes a strap 310 and a supporting plate 320 and is the same as the apparatus 100 except that the supporting plate 320 has a folding guide 330 that is a folding portion enabling up-down folding, so repeated description is omitted.

The folding guide 330 is formed such that a thickness decreases at the joint of the upper part and the lower part of the supporting plate 320, thereby enabling the upper part and the lower part of the supporting plate 320 to fold up and down and to have a restoration force against folding. In this configuration, the restoration force may use the characteristics of the material of the supporting plate 320 such as synthetic resin having a restoration force and may mean a force for returning the separate upper part and lower part of the supporting plate 320 into the same plane.

Meanwhile, penetration holes may be formed in various types in an apparatus for holding a smart phone according to the present disclosure, and various embodiments of penetration holes are described in apparatuses for holding a smart phone according to the following fourth to thirteenth embodiments of the present disclosure. Apparatuses for holding a smart phone according to the fourth to thirteenth embodiments of the present disclosure, similar to the apparatuses for holding a smart phone according to the first to third embodiments, include a strap and a supporting plate and are the same as those except for the number, shape, and structure of penetration holes, so repeated description is omitted and differences are mainly described hereafter with reference to figures.

Further, the apparatuses for holding a smart phone according to the fourth to thirteenth embodiments of the present disclosure may additionally include the hinge restoration portion 230 or the folding guide 330, and the hinge restoration portion 230 or the folding guide 330 may be formed in regions in which they do not interfere with formation of penetration holes, and in detail, may be formed within a range in which they avoid penetration holes and the portions that support fingers at the upper portion and the lower portion of the supporting plate.

Figure 10:
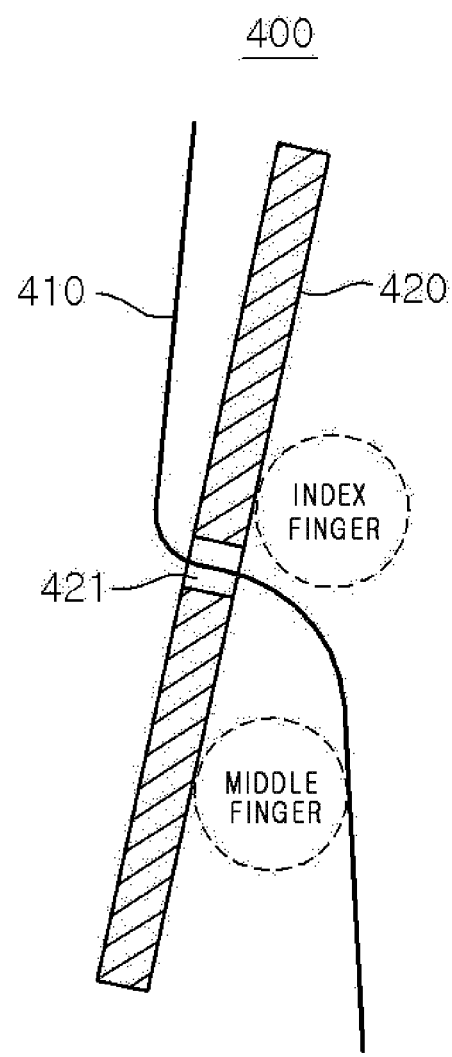
FIG. 10 is a side cross-sectional view showing an apparatus for holding a smart phone according to a fourth embodiment of the present disclosure.

FIG. 10 is a side cross-sectional view showing an apparatus for holding a smart phone according to a fourth embodiment of the present disclosure.

Referring to FIG. 10, an apparatus 400 for holding a smart phone according to a fourth embodiment of the present disclosure may have a single penetration hole 421 formed through a supporting plate 420, in which the penetration hole 421 is formed in a size smaller than the cross-section of the strap 410 so that friction increases and accordingly the supporting plate 420 can be fixed.

Figure 11:
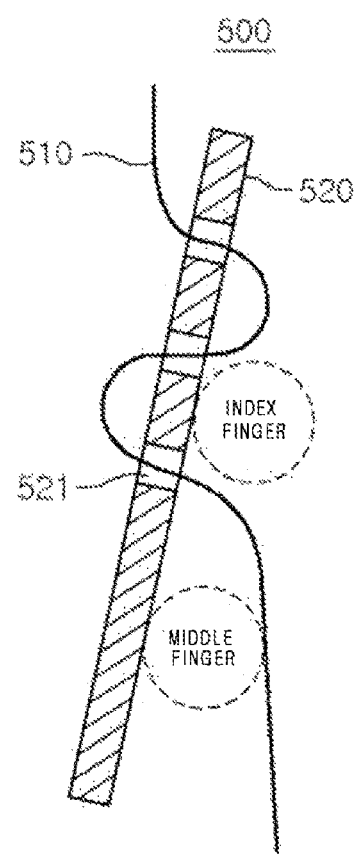
FIG. 11 is a side cross-sectional view showing an apparatus for holding a smart phone according to a fifth embodiment of the present disclosure.

FIG. 11 is a side cross-sectional view showing an apparatus for holding a smart phone according to a fifth embodiment of the present disclosure.

Referring to FIG. 11, an apparatus 500 for holding a smart phone according to a fifth embodiment of the present disclosure may have several, for example, three penetration holes 521 formed through a supporting plate 520, and in this configuration, a strap 510 passes through the penetration holes 521. The more the penetration holes 531, the larger the force that fixes the supporting plate 520, but free movement of the supporting plate 520 may be restricted.

Figure 12:
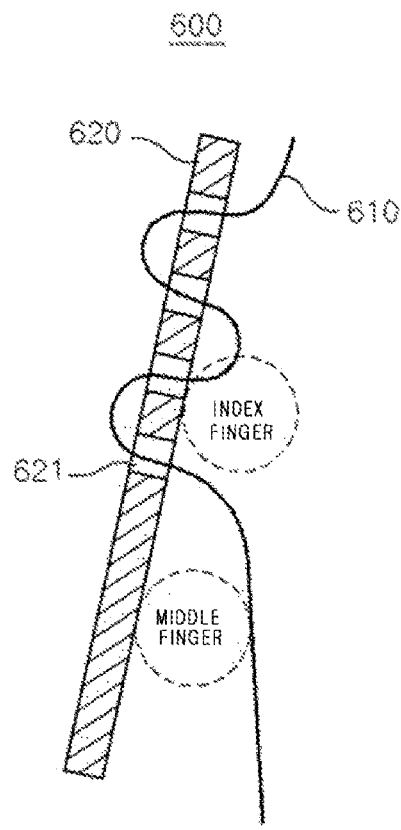
FIG. 12 is a side cross-sectional view showing an apparatus for holding a smart phone according to a sixth embodiment of the present disclosure.

FIG. 12 is a side cross-sectional view showing an apparatus for holding a smart phone according to a sixth embodiment of the present disclosure.

Referring to FIG. 12, an apparatus 600 for holding a smart phone according to a sixth embodiment of the present disclosure may have several, for example, four penetration holes 621 formed through a supporting plate 620, and in this configuration, a strap 610 passes through the penetration holes 621.

Figure 13:
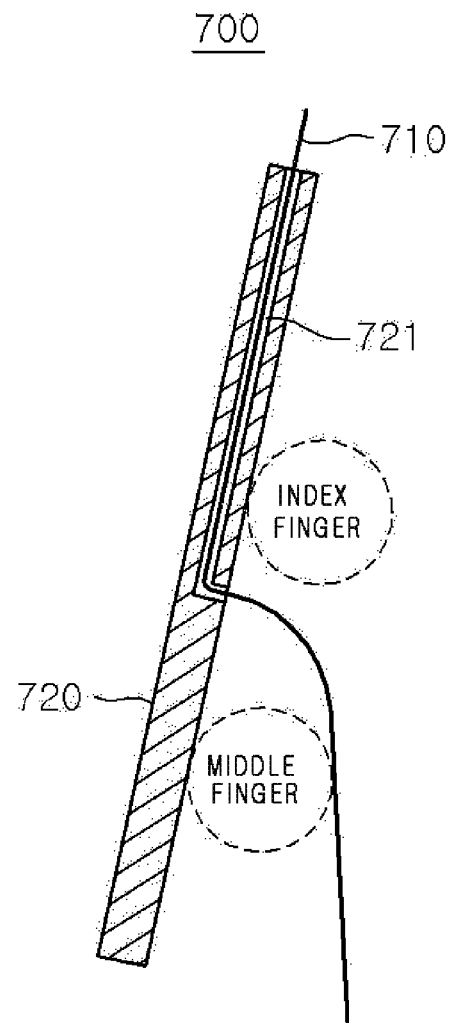
FIG. 13 is a side cross-sectional view showing an apparatus for holding a smart phone according to a seventh embodiment of the present disclosure.

FIG. 13 is a side cross-sectional view showing an apparatus for holding a smart phone according to a seventh embodiment of the present disclosure.

Referring to FIG. 13, in an apparatus 700 for holding a smart phone according to a seventh embodiment of the present disclosure, a penetration hole 721 may be formed to extend to a side of the center from an end of a supporting plate 720 through the supporting plate 720. Accordingly, a strap 710 may be installed to be inserted into the supporting plate 720 from the end and then drawn out through a side at the center of the supporting plate 720.

Figure 14:
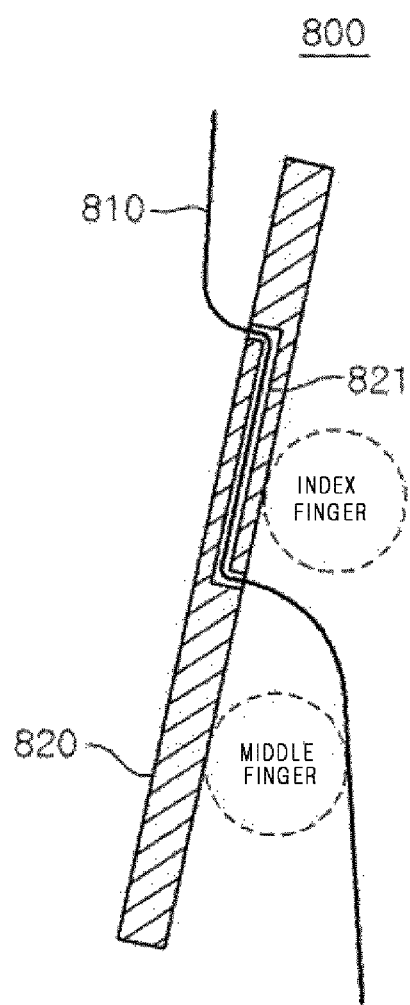
FIG. 14 is a side cross-sectional view showing an apparatus for holding a smart phone according to an eighth embodiment of the present disclosure.

FIG. 14 is a side cross-sectional view showing an apparatus for holding a smart phone according to an eighth embodiment of the present disclosure.

Referring to FIG. 14, in an apparatus 800 for holding a smart phone according to an eighth embodiment of the present disclosure, a supporting plate 820 may be formed such that a penetration hole 820 extends from a side of a predetermined portion to another side at the center. Accordingly, a strap 810 may be installed to be inserted into the supporting plate 820 from a side and then drawn out from the center of the opposite side of the supporting plate 820.

Figure 15:
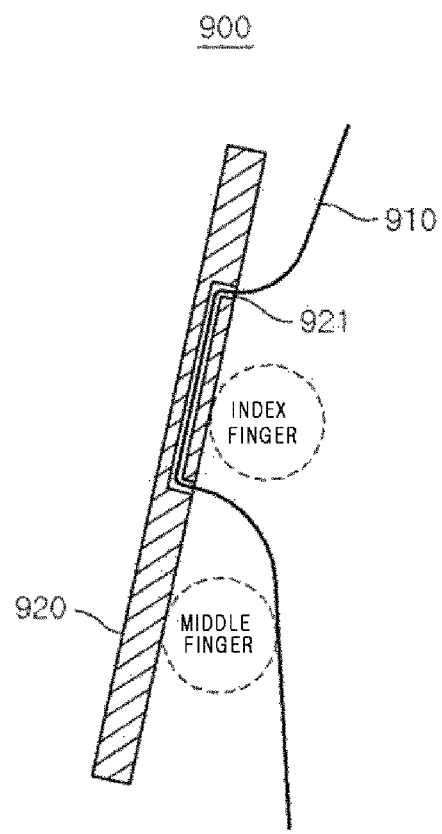
FIG. 15 is a side cross-sectional view showing an apparatus for holding a smart phone according to a ninth embodiment of the present disclosure.

FIG. 15 is a side cross-sectional view showing an apparatus for holding a smart phone according to a ninth embodiment of the present disclosure.

Referring to FIG. 15, in an apparatus 900 for holding a smart phone according to a ninth embodiment of the present disclosure, a supporting plate 920 may be formed such that a penetration hole 921 extends from a side of a predetermined portion to the side of the center. Accordingly, a strap 910 can be inserted and drawn out through the same surface of the supporting plate 920.

Figure 16:
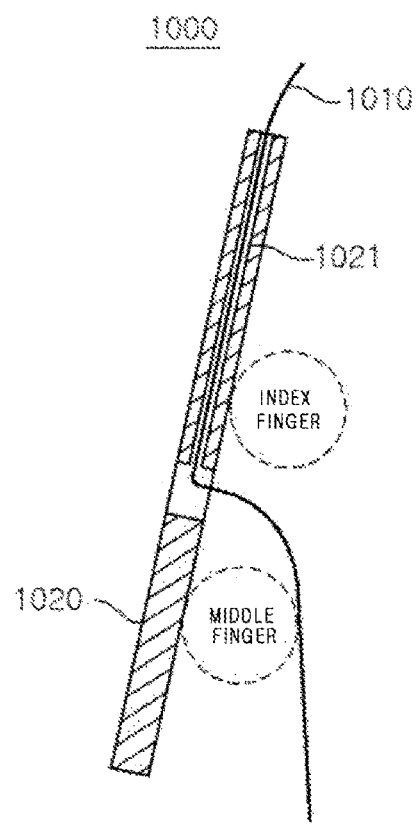
FIG. 16 is a side cross-sectional view showing an apparatus for holding a smart phone according to a tenth embodiment of the present disclosure.

FIG. 16 is a side cross-sectional view showing an apparatus for holding a smart phone according to a tenth embodiment of the present disclosure.

Referring to FIG. 16, in an apparatus 1000 for holding a smart phone according to a tenth embodiment of the present disclosure, a supporting plate 1020 may be formed such that a penetration hole 1021 extends to the center from an end thereof and penetrates the center. Accordingly, a strap 1010 can be inserted into the supporting plate from the end and then drawn out from any one of both sides through the penetration hole at the center.

Figure 17:
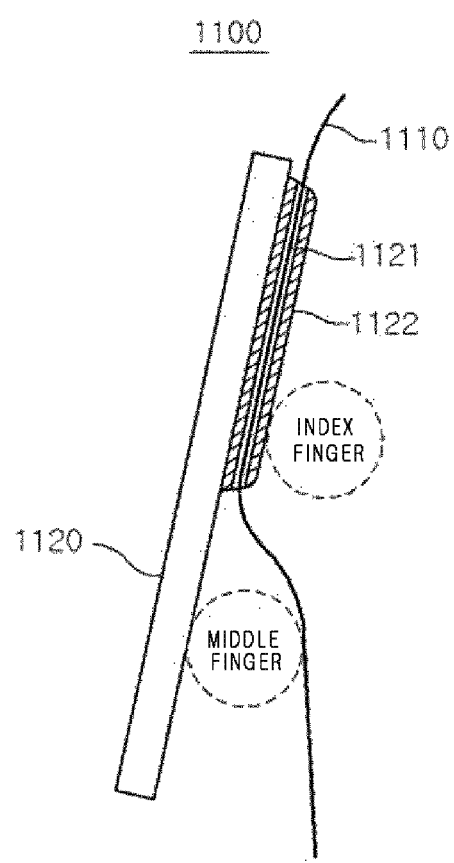
FIG. 17 is a side cross-sectional view showing an apparatus for holding a smart phone according to an eleventh embodiment of the present disclosure.

FIG. 17 is a side cross-sectional view showing an apparatus for holding a smart phone according to an eleventh embodiment of the present disclosure.

Referring to FIG. 17, in an apparatus 1100 for holding a smart phone according to an eleventh embodiment of the present disclosure, a supporting plate 1120 may be formed such that a penetration hole 1121 extends from an end to the center of thereof through a protrusion 1122 formed to extend from the end to the center on a side. Accordingly, a strap 1110 may be installed through the protrusion 1122 from an end to the center of the protrusion 1122 on the supporting plate 1120.

Figure 18:
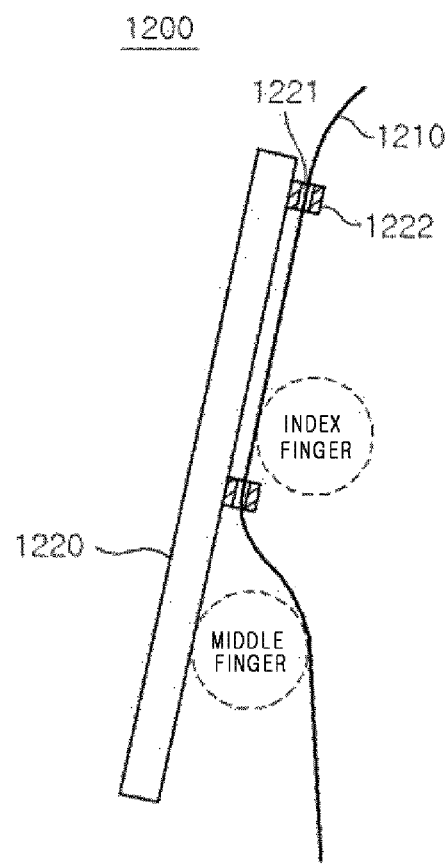
FIG. 18 is a side cross-sectional view showing an apparatus for holding a smart phone according to a twelfth embodiment of the present disclosure.

FIG. 18 is a side cross-sectional view showing an apparatus for holding a smart phone according to a twelfth embodiment of the present disclosure.

Referring to FIG. 18, in an apparatus 1200 for holding a smart phone according to a twelfth embodiment of the present disclosure, a supporting plate 1220 may be formed such that a penetration hole 1221 is formed through each of protrusions 1122 formed at an end and the center on a side. Accordingly, a strap 1210 may be installed through the penetration holes 1221 of the protrusions 1222.

Figure 19:
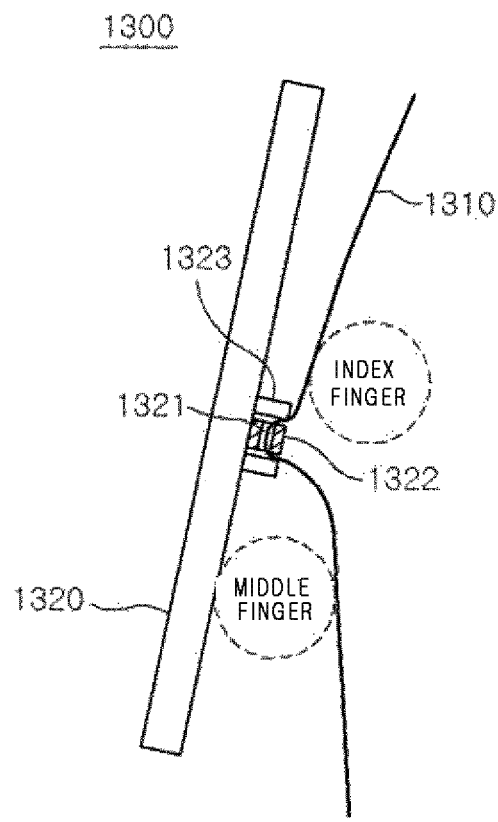
FIG. 19 is a side cross-sectional view showing an apparatus for holding a smart phone according to a thirteenth embodiment of the present disclosure.

FIG. 19 is a side cross-sectional view showing an apparatus for holding a smart phone according to a thirteenth embodiment of the present disclosure.

Referring to FIG. 19, in an apparatus 1300 for holding a smart phone according to a thirteenth embodiment of the present disclosure, a penetration hole 1321 may be formed in a protrusion 1322 formed at the center on a side of a supporting plate 1320 and supporting projections 1323 supporting a strap 1310 may be formed over and under the protrusion 1322, respectively. Accordingly, the strap 1310 is inserted through the penetration hole 1321 of the protrusion 1322 and supported by the supporting projections 1323 at both sides of the penetration hole 1321, respectively.

Figure 20:
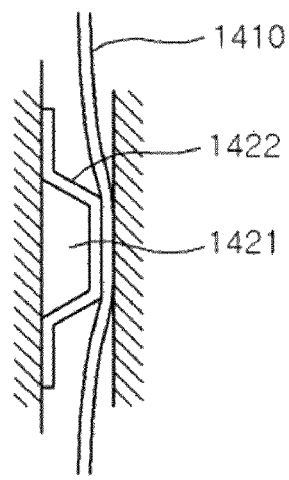
FIG. 20 is a side cross-sectional view showing an apparatus for holding a smart phone according to a fourteenth embodiment of the present disclosure.

Referring to FIG. 20, in an apparatus for holding a smart phone according to a fourteenth embodiment of the present disclosure, an elastic member 1422 pressing a strap 1410 may be installed in a penetration hole 1421. Various elastic members including a coil spring and a plate spring may be used as the elastic member 1422. The configuration of the elastic member 1422 in this embodiment can be applied to all of embodiments.

Figure 21:
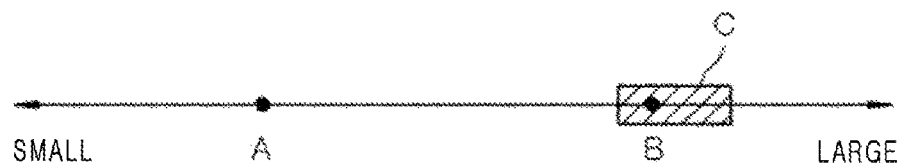
FIG. 21 is a view for illustrating action of an apparatus for holding a smart phone according to the present disclosure.
Figure 21:
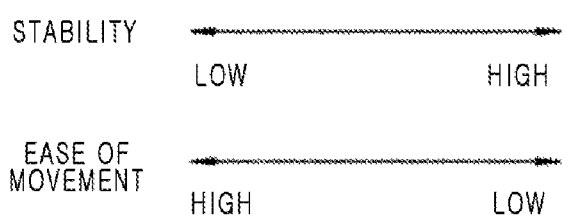
Figure 22:
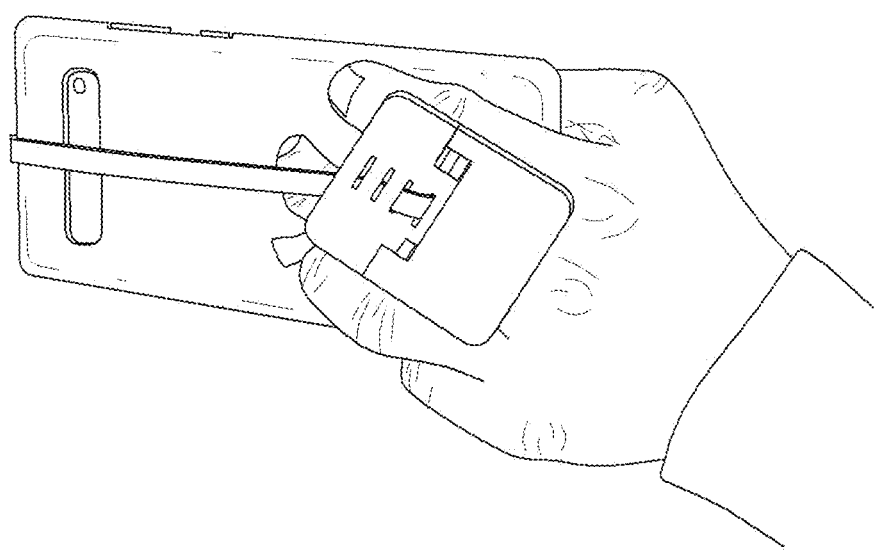
FIG. 22 is an image showing an example of transversely taking a picture with the supporting plate moved down in the apparatus for holding a smart phone according to the present disclosure.
Figure 23:
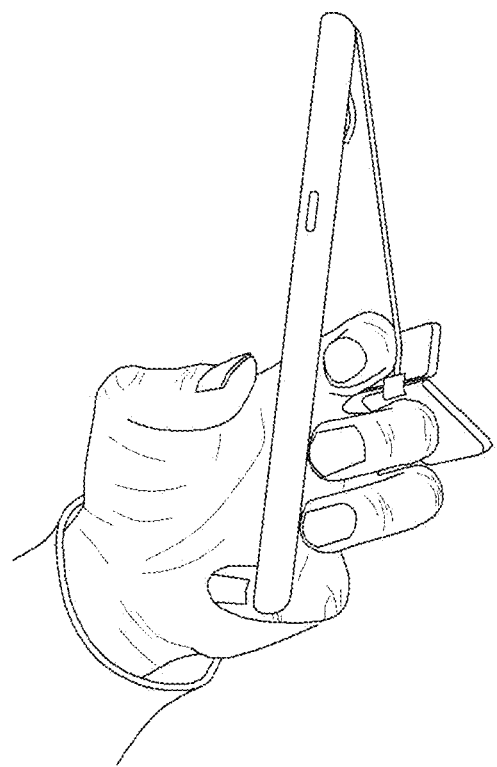
FIG. 23 is an image showing an example of typing on a keyboard with the supporting plate moved down in the apparatus for holding a smart phone according to the present disclosure.
Figure 24:
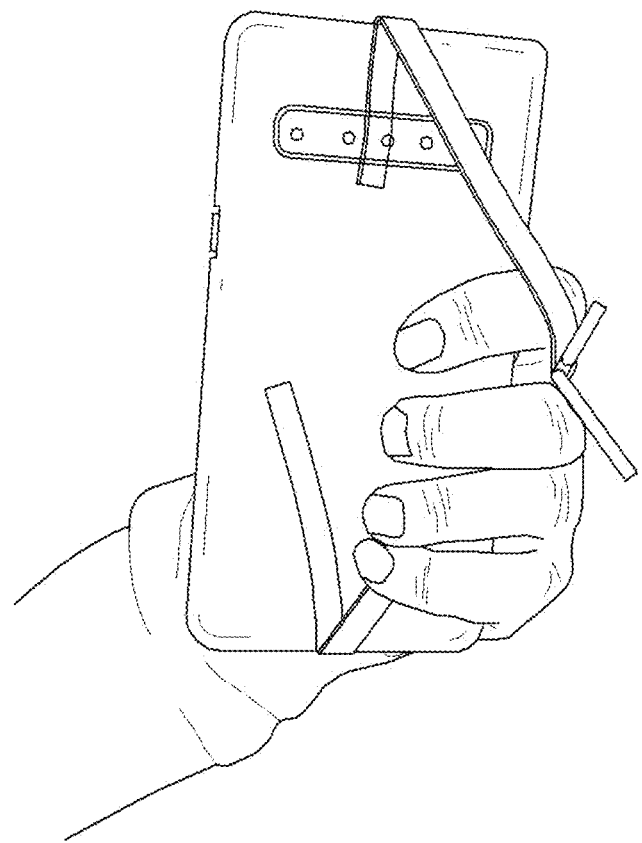
FIGS. 24 and 25 are images showing an example of operating a smart phone with one hand with the supporting plate laterally pulled in the apparatus for holding a smart phone according to the present disclosure.
Figure 25:
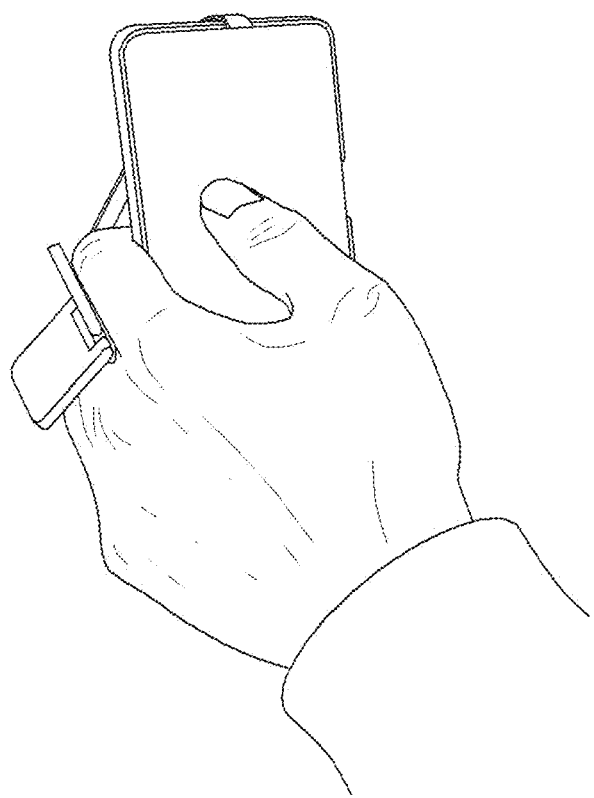
Figure 26:
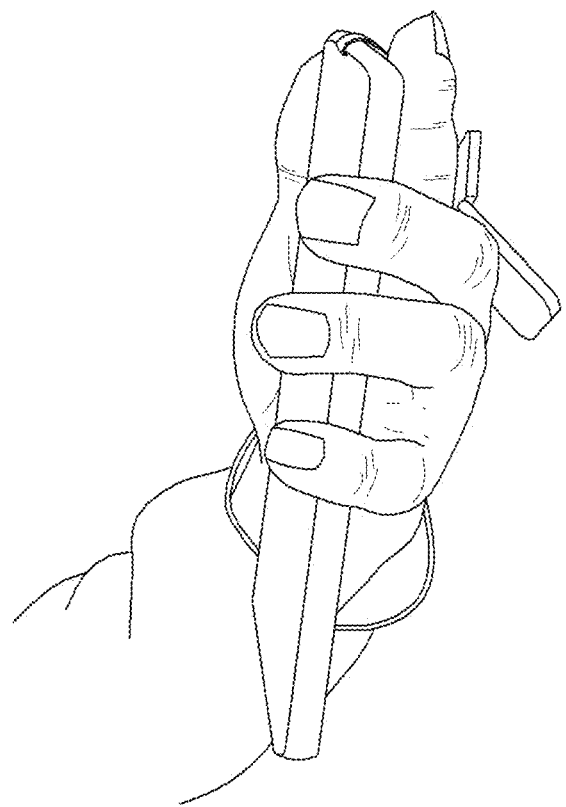
FIGS. 26 and 27 are images showing an example of watching a video with the supporting plate moved up in the apparatus for holding a smart phone according to the present disclosure.
Figure 27:
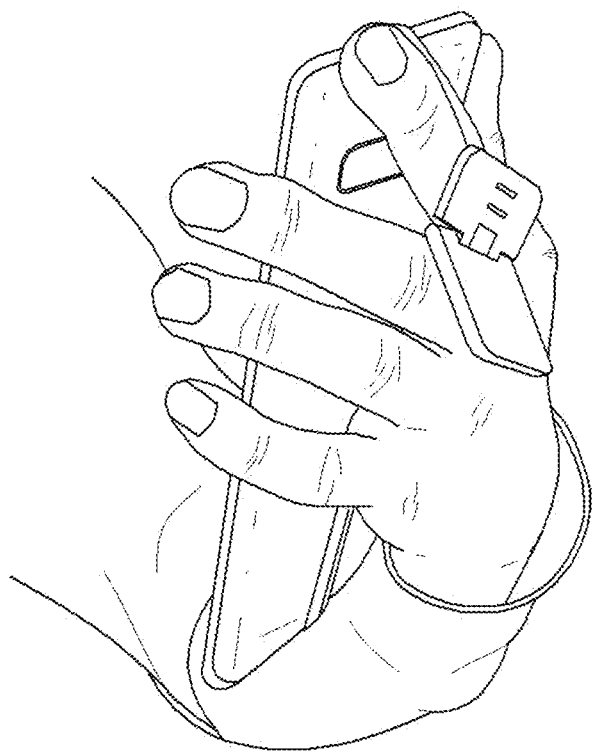

Referring to FIG. 21, which is for illustrating action of friction between a strap and a supporting plate, when friction under maximum friction A that allows a supporting plate to move on a strap without being fixed acts between the supporting plate and the strap, the supporting plate freely moves on the strap hung at an angle or vertically even without an external force. Further, when friction exceeding the maximum friction A acts between the strap and the supporting plate, the supporting plate is moved along the strap by an applied external force, and an optimal friction section C between the supporting plate and the supporting plate exists around minimum friction B that enables the supporting plate to support the weight of a smart phone. Accordingly, stability when supporting a smart phone and ease of movement of the supporting plate are inversely proportional to each other in accordance with the magnitude of friction. That is, stability when supporting a smart phone is proportioned to the magnitude of friction, but ease of movement of a supporting plate is inversely proportional to the magnitude of friction. As described above, a process of setting fundamental friction between a strap and a supporting plate within a range in which a supporting plate can be easily moved by hand while the fundamental friction supports the weight of a smart phone may be obtained through simulation or experiments.

In the present disclosure, it is possible to enable fundamental friction between a strap and a supporting plate to support the weight of a smart phone and the supporting plate can be moved by hand regardless of whether the number of penetration hole is one or more so that the smart phone can be normally used. Actually, large friction is not required to support the weight of a smart phone, and for example, as in the following Table 1, the weight of most smart phones by Apple and Samsung on the market is distributed between the mid 100 g and low 200 g. Even though the case weight of about 10-40 g is added thereto, the total weight is about 250 g or less, so friction between a strap and a supporting plate has only to support the weight.

TABLE 1

| Apple | Weight (g) | Samsung | Weight (g) |
|---|---|---|---|
| iPhone x | 174 | Galaxy s10 | 157 |
| iPhone xr | 194 | Galaxy s20 | 163 |
| iPhone xs | 177 | Galaxy a51 | 187 |
| iPhone xs max | 208 | Galaxy a31 | 186 |
| iPhone se | 148 | Galaxy Note 9 | 201 |
| iPhone 11 | 194 | Galaxy Note 10 | 168 |
| iPhone 11 pro | 188 | Galaxy Note 20 | 192 |
| iPhone 11 pro max | 226 | Galaxy Note 20 ultra | 208 |
| iPhone 12 mini | 135 | Galaxy z Flip | 183 |
| iPhone 12 | 164 | Galaxy z Fold 2 | 282 |
| iPhone 12 pro | 189 | | |
| iPhone 12 pro max | 228 | | |

Various examples of using an apparatus for holding a smart phone according to the present disclosure are shown in FIGS. 22 to 27, and, according to the examples, it is possible to optimally use smart phones having various functions using various grips depending on the position of the supporting plate on the strap.

Meanwhile, another description of the present disclosure provides a mobile device grip assistive device that includes: a strap disposed in the up-down direction behind a mobile device and having flexibility; and a mechanism portion having a penetration hole, through which the strap can be disposed, and having a holding space in which friction is provided by an elastic restoration force of the strap when a finger is inserted between the front surface of a plate member and the rear surface of the strap.

In this configuration, the plate member should be understood as having substantially the same function as the supporting plate in the examples described above.

In the following description, a mobile device means various types of portable communication devices having a display, including the smart phone, and may be understood as including not only common mobile phones, but a PDA, a navigation, a tablet PC, etc. that include a screen and have mobility.

Figure 28:
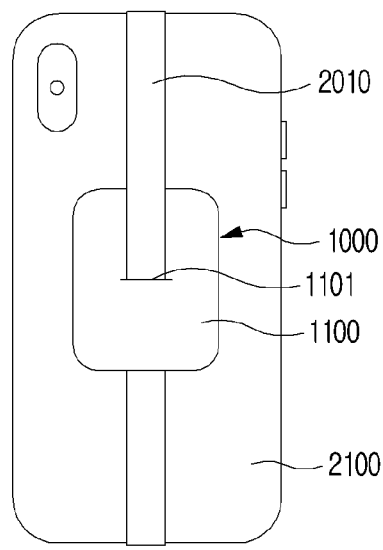
FIG. 28 is a front view of a mobile device grip assistive device according to a fifteenth embodiment of the present disclosure.

FIG. 28 is a front view of a mobile device grip assistive device according to a fifteenth embodiment of the present disclosure.

The state in which the device is disposed behind a mobile device as shown in figures is defined as the front in the description of the present disclosure.

A strap 2010 is disposed in the up-down direction behind a mobile device and preferably disposed vertically at the center in the width direction, but is not limited thereto and may be disposed at a predetermined angle. Accordingly, the up-down direction does not mean only the direction perpendicular to the width of a mobile device in the description of the present disclosure.

An example in which the upper and lower ends of the strap 2010 are fixed by friction between the inner surface of a case 2100 and the outer surface of a mobile device is described as a fundamental case, but the upper and lower ends may be bonded by a predetermined adhesive member, and, depending on cases, it may be considered that the upper and lower ends are attached to the housing of a mobile device without the case 2100.

It is preferable that the strap 2010 is made of a material having flexibility at least in the up-down direction in accordance with the concept of the present disclosure, and the material does not limit the present disclosure. The strap 2010 generates a holding relationship between a finger and the mechanism portion 1000 by an elastic restoration force, as will be described below, and to this end, a material having an appropriate modulus of elasticity may be selected. That is, a modulus of elasticity and a friction coefficient, which enable the strap to be able to be supported in a predetermined hole formed at the mechanism portion 1000 and to be able to adapt insertion of a finger, deformation, etc. with some flexibility without excessively loosening when the weight of a mobile device and/or the case 2100 is applied to the mechanism portion 1000 by a finger, may be selected.

As in the embodiment shown in the figure, when the strap 2010 is fixed at the upper and lower ends on the inner surface of the case 2100, the entire length of the strap 2010 may be somewhat larger than the up-down length of the case 2100.

The mechanism portion 1000 is disposed on a portion of the strap 2010 and substantially performs a function of providing a holding force of a finger. In embodiments of the present disclosure, modified examples of the mechanism portion 1000 are provided and fundamentally have a plate member 1100 and a hole 1101.

It is preferable that the plate member 1100 has a length in the up-down direction such that it has a predetermined area, can rub with a finger, and can function as a lever to be able to an elastic restoration force by being coupled to the strap 2010.

In the fifteenth embodiment of the present disclosure, the mechanism portion 1000 has a plate member 1100 formed in a single plate type and a hole 1101 formed through the plate member 1100 in the front-rear direction.

The plate member 1100 is made of a material that is not deformed easier than the strap 2010, and for example, any one of synthetic resin, wood, glass, rubber, and metal may be selected.

The plate member 1100 may be formed entirely in a rectangular and is not limited in shape as long as it can support a finger and can come in contact with the rear of a mobile device. However, it is preferable that the plate member 1100 has a length such that it can somewhat cover at least the up-down length of the strap 2010.

In the fifteenth embodiment of the present disclosure, the plate member 1100 is composed of a single plate and the hole 1101 through which the strap 2010 can be inserted is formed substantially at the center in the width direction.

A position can be somewhat fixed in the hole 1101 by friction with the strap 2010, but friction that enables a height to be adjusted may be selected by a user.

According to this embodiment, in a keeping state, the rear surface of the plate member 1100 is in close contact with the front surface of the strap 2010 at the upper portion and the front surface of the plate member 1100 is in close contact with the rear surface of the strap 2010 at the lower portion with the hole 1101 therebetween. Accordingly, the space between the strap 2010 and the plate member 1100 at the lower portion performs a function of providing a holding force, which will be described in detail below.

Figure 29:
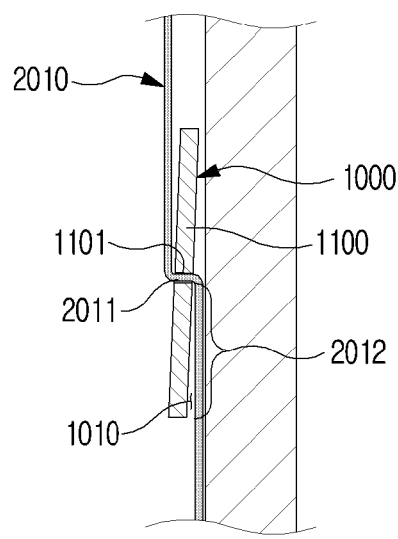
FIG. 29 is a side cross-sectional view of the mobile device grip assistive device of FIG. 28.

FIG. 29 is a side cross-sectional view of the mobile device grip assistive device of FIG. 28.

The mechanism portion 1000 and the strap 2010 are disposed behind the case 2100 and description repeated with the above description is omitted. The mobile device grip assistive device and the case 2100 are spaced apart from each other for the convenience of description, and the strap 2010 and/or the mechanism portion 1000 may be disposed in close contact with the case 2100 if a load is not applied in an actual use example.

As described above, the upper part and the lower part from the portion of the hole 1101 at which the strap 2010 and the mechanism portion 1000 are coupled supplement each other, and a space that provides a predetermined holding force is formed between the front surface of the lower portion of the plate member 1100 and the rear surface of the strap 2010 facing it.

In detail, the portion of the strap 2010 that is inserted in the hole 1101 is defined as an insertion section 2011 and the portion facing the lower portion of the plate member 1100 is defined as a tension providing section 2012.

Further, the gap space between the tension providing section 2012 and the plate member 1100 is defined as a holding space 1010.

The plate member 1100 is formed in a thin type of which the thickness is small relative to the width or the height and the strap 2010 bends at the hole 1101 by the predetermined thickness. In the fifteenth embodiment, there are at least two bends, and an elastic restoration force improves friction at the insertion section 2011, whereby the function of keeping the position of the mechanism portion 1000 on the strap 2010 would be enhanced.

Referring to the state shown in the figure, it can be seen that, at the insertion section 2011, a restoration force always acts on the strap 2010 and torque is generated such that the upper portion of the plate member 1100 rotates toward the mobile device and the lower portion of the plate member 1100 rotates away from the mobile device. It should be noted that this configuration generates a force suitable for the use state shown in FIG. 30.

The insertion section 2011 functions as a predetermined hinge and can operate as a pivot on which the plate member 1100 can rotate with respect to the strap 2010. This configuration allows predetermined deformation of the strap 2010 when the mobile device is held, thereby enhancing a grip ability when gripping the housing or the case 2100 of the mobile device by hand. The grip assistive function is described in detail with reference to FIG. 30.

Figure 30:
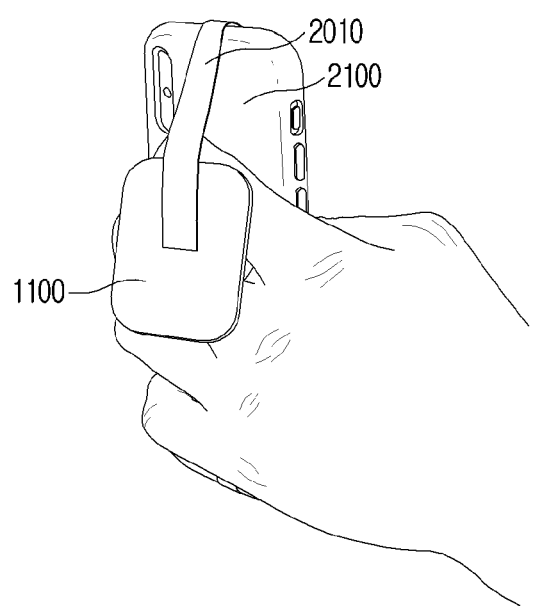
FIG. 30 is a view showing a use state of the mobile device grip assistive device of FIG. 28.

FIG. 30 is a view showing a use state of the mobile device grip assistive device of FIG. 28.

Referring to FIG. 29, the rear surface of the upper portion of the plate member 1100 is in close contact with the front surface of the strap 2010, and the strap 2010 is stretched by an inserted finger (index finger), whereby the close-contact force of the upper portion is further increased by an elastic restoration force. That is, at the upper portion, the finger pushes the plate member 1100 such that the plate member 1100 rotates rearward against the strap 2010.

Another finger (middle finger) is inserted in the holding space 1010 that is the space between the lower portion of the plate member 1100 and the strap 2010.

That is, depending on the insertion states of fingers, the strap 2010 deforms and the deformed strap 2010 fundamentally applies a restoration force rearward. In this case, the plate member 1100 rotates around the hole 1101 and a pushing force the moves the plate member 1100 and the strap 2010 toward each other acts in the holding space 1010. The pushing force presses a finger such that the finger can be fixed on the mobile device grip assistive device, so it is possible to hold the mobile device with a relatively small force using the other finger.

The operation of the pushing force is described in more detail. It can be seen that the pushing force comes from a rearward restoration force due to deformation of the tension providing section 2012 of the strap 2010 under the hole 1101 and a rotation force due to the plate member 1100 pushed rearward over the hole 1101.

The holding way of the mobile device grip assistive device of the present disclosure is not limited to the example shown in the figures and the kind, way, or position of fingers that are inserted is selective. This will be described below through another embodiment.

Figure 31:
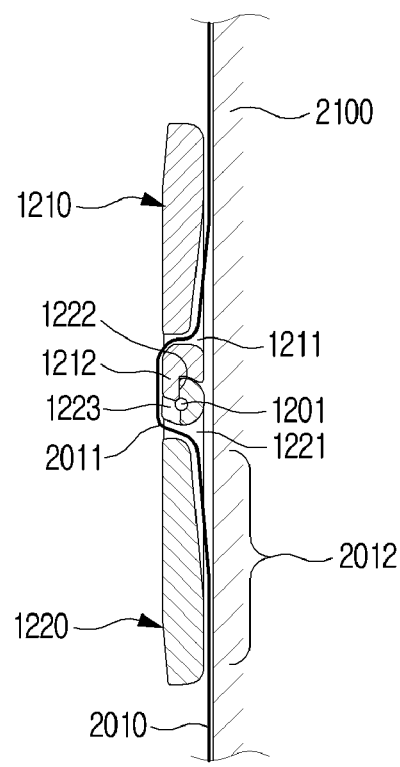
FIG. 31 is a side cross-sectional view of a mobile device grip assistive device according to a sixteenth embodiment of the present disclosure.

FIG. 31 is a side cross-sectional view of a mobile device grip assistive device according to a sixteenth embodiment of the present disclosure.

It can be understood that since the plate member 1100 is composed of a single plate, restoration forces act in different directions at the upper and lower portions in the fifteenth embodiment described above. For more efficient use, the plate member of the mechanism portion 1000 is composed of two plates in the sixteenth embodiment.

A first plate member 1210 at the upper portion and a second plate member 1220 at the lower portion are connected to a shaft 1201 such that they can rotate with respect to each other, and structures for coupling the strap 2010 are formed.

Accordingly, a first hole 1211 is formed at the first plate member 1210 over the hinge portion and a second hole 1221 is formed at the second plate member 1220 under the hinge portion. Since two holes are formed in this way, a difference is generated in the front-rear disposition relationship of the strap 2010.

That is, when the strap 2010 is moved down, the strap 2010 is drawn out rearward from the front of the first plate member 1210 through the first hole 1211 and is drawn out and extended forward from the rear through the second hole 1221. Accordingly, the strap 2010 covers the hinge portion when seen from the rear.

Since the strap 2010 covers the structure operating in this configuration and surfaces of the upper and lower plate members are exposed rearward, it is aesthetically excellent and is advantageous in preparing a space in which brands or advertisements can be exposed.

As a modified example of the present disclosure, both the first hole 1211 and the second hole 1211 may be disposed at the first plate member 1210 such that only the restoration force of an elasticity providing member 1230 acts on the second plate member 1220.

Similar to the fifteenth embodiment, the mechanism portion 1000 has a rotation relationship with respect to the strap 2010 and has a holding force by providing the holding space 1010 at the lower portion, and the entire portion connected from the first hole 1211 to the second hole 1221 can perform the function of keeping a predetermined position.

It should be noted that since the overlap area is large, the ability of keeping the position of the mechanism portion 1000 with respect to the strap 2010 is further improved.

The first plate member 1210 and the second plate member 1220 can rotate with respect to each other, and are disposed substantially parallel with each other in the state shown in the figure. However, it may be preferable that the first plate member 1210 and the second plate member 1220 have a predetermined angle, for example, 170°~175° when an external force is not applied in consideration of efficiency in insertion of fingers, etc.

The first plate member 1210 and the second plate member 1220 may operate in the type of folding rearward, and as shown in the figure, a restoration force may acts in the unfolding direction. Accordingly, a predetermined stopper structure may be provided to prevent forward folding, and an upper step 1222 and a lower step 1223 may serve to determine the up-down rotation angle. This will be described in detail below.

Figure 32:
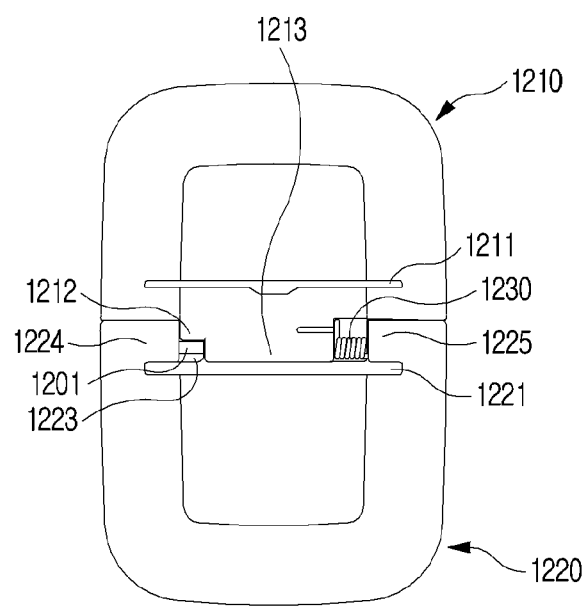
FIG. 32 is a front view of the mobile device grip assistive device of FIG. 31.

FIG. 32 is a front view of the mobile device grip assistant of FIG. 31.

The first plate member 1210 and the second plate member 1220 have a predetermined hole (not indicated by reference numeral) through which a shaft 1201 can be disposed, a first support 1224 and a second support 1225 protrude upward for connection at both sides of the second plate member 1220 at the lower portion, and a connecting protrusion 1213 protruding downward from the first plate member 1210 is inserted between the supports.

In the embodiment shown in the figure, a structure that determines a rotation angle is disposed at a side, elasticity providing members 1230 that can horizontally provide a restoration force to each other are disposed, and this disposition relationship may be replaced or repeated.

A predetermined gap space is provided between the first support 1224 and the connecting protrusion 1213, and the rear portion of the first plate member 1210 is on the front portion of the second plate member 1220. The rear portion of the first plate member 1210 is determined as a retainer 1212.

Referring to FIG. 31, when an external force is not provided, the retainer 1212 is locked at the upper step 1222 in close contact with the case 2100 to maintain a folded state and a maximum rotation (folding) angle of the first plate member 1210 is determined with respect to the second plate member 1220 at the lower step 1223. The maximum rotation angle may be 60° or more and less than 90° as an acute angle. For example, when the maximum rotation angle is up to 90°, there may be limitation in usability such as mounting, so it is preferable to allow the first plate member to slightly further rotate than the case in which they are perpendicular to each other from a fully folded state. However, the angle is not limited to the example described above.

Figure 33:
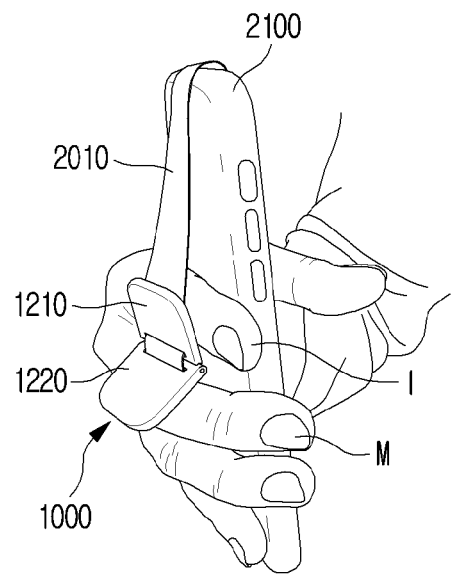
FIGS. 33 to 35 are views showing a use state of the mobile device grip assistive device according to the sixteenth embodiment of the present disclosure.
Figure 34:
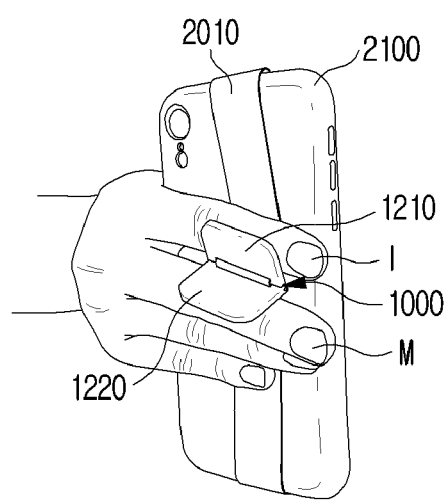
Figure 35:
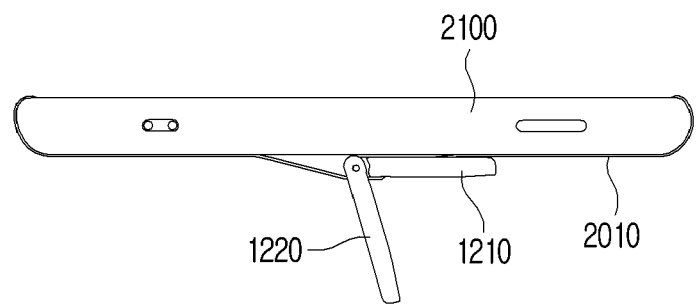

FIGS. 33 to 35 are views showing a use state of the mobile device grip assistive device according to the sixteenth embodiment of the present disclosure.

In FIG. 33, similar to the fifteenth embodiment, one finger is positioned in front of the first plate member 1210 and the strap 2010 and another finger is positioned the holding space 1010 formed ahead of the second plate member 1220 and behind the strap 2010.

In this case, it should be noted that the elastic restoration force of the strap 2010 acts around the tension providing section 2012 and a forward rotation force of the second plate member 1220 by the elasticity providing member 1230 also acts, thereby performing holding.

The restoration force of the elasticity providing member 1230 brings the first plate member 1210 in close contact with the strap 2010.

As a preferable case, the case 2100 is gripped by the entire palm with an index finger I inside the first plate member 1210 and the strap 2010 and a middle finger M across the holding space 1010. It should be noted that a grip state is maintained by action of the strap 2010 and the mechanism portion 1000 even without gripping the edge of the case 2100 by fingers as in the related art. Accordingly, fatigue of fingers or a wrist may be remarkably reduced.

Meanwhile, due to the action described above, the strap 2010 is slightly biased to another side and a transverse restoration force also acts, so grip is further secured.

FIG. 34 shows the case in which the holding space 1010 is formed at both of upper and lower portions.

It shows the state in which the upper and lower parts of the mechanism portion 1000 are both folded rearward with the upper and lower portions of a mobile device or the upper and lower ends of the strap 2010 of the case 2100 fixed.

In this case, an index finger I is inserted between the front surface of the first plate member 1210 and the rear surface of the strap 2010, a middle finger M is inserted between the front surface of the second plate member 1220 and the rear surface of the strap 2010, and a holding force is provided by tension of the strap 2010 and a forward rotational restoration force applied to the first plate member 1210 and the second plate member 1220 by the elasticity providing member 1230.

This use state shows a similar aspect to a butterfly symmetrically up and down.

FIG. 35 shows the case in which the mobile device grip assistive device according to the sixteenth embodiment of the present disclosure is used like a cradle.

For use as a cradle, most part of the strap 2010 is disposed in close contact with the rear surface of the case 2100, any one selected from the first plate member 1210 and the second plate member 1220 is disposed in close contact with the rear surface of the case 2100 (in which, it should be understood that there is a slight gap between the strap and the plate members, but the case in which they are spaced apart for the structure is also included in the concept of close contact), and the other one is erect toward a floor such that a mobile device can has a predetermined angle with respect to the floor. In the embodiment shown in the figure, the first plate member 1210 is in close contact with the case 2100 and the second plate member 1220 is in direct contact with the floor at a predetermined angle.

As shown in the figure, a mobile device is transversely disposed with respect to the floor and the edge of the second plate member 1220 is in contact with the floor with any one selected from both sides supported on the floor such that it can be erect.

The elastic restoration force by the elasticity providing member 1230 and a restoration force by tension of the strap 2010 both acts on the second plate member 1220, but the rotation state can be maintained by the weights of the mobile device and the case 2100. According to this concept, it is preferable that the angle defined by the second plate member 1220 and the first plate member 1210 is less than 90° as an acute angle. That is, the maximum allowable angle that is determined by the retainer 1212 and the lower step 1223 is determined as being less than 90°.

Figure 36:
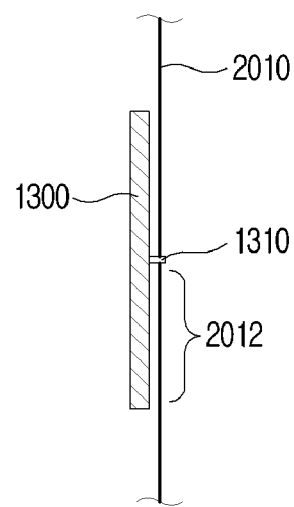
FIG. 36 is a side view of a mobile device grip assistive device according to a seventeenth embodiment of the present disclosure.

FIG. 36 is a side view of a mobile device grip assistant according to a seventeenth embodiment of the present disclosure.

The seventeenth embodiment of the present disclosure may be considered as a modified example of the fifteenth embodiment, so a plate member is composed of a single flat plate and becomes a flat plate member 1300.

Unlike the fifteenth embodiment, an up-down insertion portion 1310 is formed through the top and bottom without the hole 1101 formed through the front and rear. As an embodiment of the installation type of the up-down insertion portion 1310, as in the case shown in the figure, the case in which a penetration hole is formed in the up-down direction through a projection protruding forward may be considered. As another embodiment, the case in which a penetration hole is formed in the up-down direction through a portion of the flat plate member 1300 may also be considered. However, in this case, it may be partially bent or a horizontal hole may be additionally formed.

The strap 2010 is disposed through the up-down insertion portion 1310 in the up-down direction and the flat plate member 1300 may be divided into an upper part and a lower part by the up-down insertion portion 1310.

Even in this case, a holding space 101 is formed at the lower portion, the up-down insertion portion 1310 provides an insertion section 2011, and a rotation motion and tension may be provided around this portion.

Figure 37:
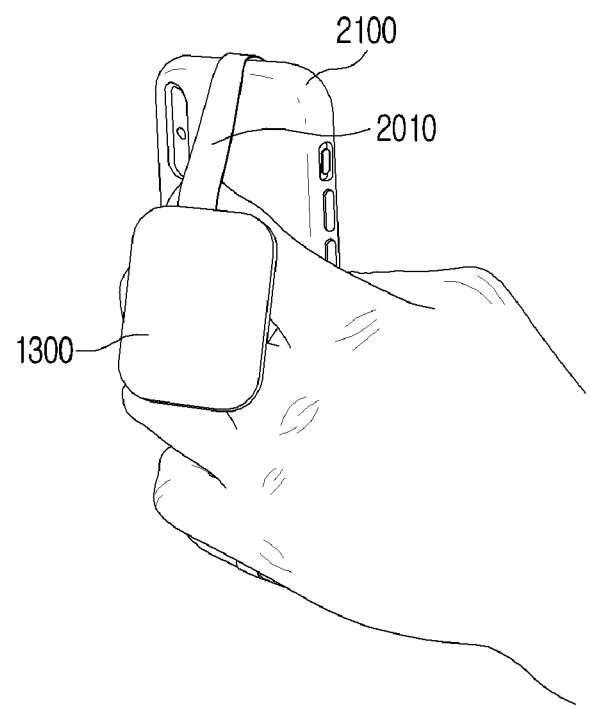
FIG. 37 is a view showing a use state of the mobile device grip assistive device according to the seventeenth embodiment of the present disclosure.

FIG. 37 is a view showing a use state of the mobile device grip assistant according to the seventeenth embodiment of the present disclosure.

A middle finger M is inserted in a holding space 1010 formed at the lower part of the flat plate member 1300 from the up-down insertion portion 1310 and an index finger I is inserted in front of the strap 2010.

In this case, similar to the fifteenth embodiment, forward rotation power at the lower portion is generated by the restoration force of the strap 2010 in the holding space 1010 and outward rotation of the flat plate member 1300 at the upper portion, which results in a holding force.

The use states shown in FIGS. 33 to 34 may be applied or referred to in all of embodiments of the present disclosure and may be applied to various modified examples when those follow the spirit of the present disclosure. Further, other fingers, other directions, and other combinations other than the grip type exemplified in the present disclosure may be used, which means the structure of the present disclosure is simple and has excellent adaptation to a use environment.

Since an effective holding force is provided by adapting to various type of grips even by a simple structure of a plate and a strap by the mobile device grip assistive device of the present disclosure described above, it is possible to contribute to not only convenience in use, but productivity and economics.

Further, since a mobile device is held by fingers or a palm by combining a rotation type and an elastic restoration force, load on muscles for gripping mobile device decreases and it is possible to contribute to the health of a user.

Further, since thin members are used, a disadvantage in height remarkably decreases as compared with the complicated structure of a ring type or a large-volume case in the related art, which results in reduction of volume and weight. Accordingly, there is an effect of being able to improve portability.

The present disclosure was described above on the basis of embodiments and the accompanying drawings. However, the range of the present disclosure is not limited by the embodiments and drawings and may be limited only by claims to be described below.

The invention claimed is:

1. An apparatus for holding a smart phone, comprising:
    a strap having elasticity in a longitudinal direction and disposed on a rear surface of a smart phone; and
    a supporting plate having a first plate and a second plate that are connected to each other,
    the first plate located at an upper portion of the strap and having a first hole through which the strap passes,
    the second plate located at a lower portion of the strap and having a second hole through which the strap passes, the second plate being connected to the first plate via a hinge shaft allowing the first plate and the second plate to rotate relative to each other in a direction away from the strap, wherein an elasticity providing member positioned at the hinge to provide a restoring force for returning the first and second plates to a planar configuration that contacts the strap.

2. The apparatus of claim 1, wherein the supporting plate maintains a position where the supporting plate is coupled to the strap when an external force is not applied.

3. The apparatus of claim 1, wherein the first and second plates of the supporting plate are supported by different fingers when the first and second plates rotate relative to each other.

4. The apparatus of claim 1, further comprising a case to which both ends of the strap are coupled.

* * * * *